(12) United States Patent
Eriksen

(10) Patent No.: US 8,427,327 B2
(45) Date of Patent: Apr. 23, 2013

(54) LIQUID FLOW MEASURING DURING BUOY-LOADING

(75) Inventor: Egil Eriksen, Foldrøyhamn (NO)

(73) Assignee: Tool-Tech AS, Rykkinn (NO)

( * ) Notice: Subject to any disclaimer, the term of this patent is extended or adjusted under 35 U.S.C. 154(b) by 279 days.

(21) Appl. No.: 12/934,253

(22) PCT Filed: Mar. 19, 2009

(86) PCT No.: PCT/NO2009/000102
§ 371 (c)(1),
(2), (4) Date: Dec. 20, 2010

(87) PCT Pub. No.: WO2009/120087
PCT Pub. Date: Oct. 1, 2009

(65) Prior Publication Data
US 2011/0108127 A1    May 12, 2011

(30) Foreign Application Priority Data
Mar. 27, 2008  (NO) .................................. 20081512

(51) Int. Cl.
*G08B 21/00* (2006.01)
(52) U.S. Cl.
USPC ........... 340/605; 340/603; 340/606; 340/611; 340/626; 137/12; 73/40.5 R
(58) Field of Classification Search .................... 340/603
See application file for complete search history.

(56) References Cited

U.S. PATENT DOCUMENTS

| | | | |
|---|---|---|---|
| 3,807,220 A * | 4/1974 | Ottenstein et al. | 73/40.5 R |
| 7,453,367 B2 | 11/2008 | Spaolonzi et al. | |
| 2005/0122225 A1* | 6/2005 | Kram et al. | 340/605 |
| 2008/0011056 A1* | 1/2008 | Spaolonzi et al. | 73/40 |

FOREIGN PATENT DOCUMENTS

| | | |
|---|---|---|
| NO | 180132 A | 2/1996 |
| NO | 317072 A | 2/2001 |

OTHER PUBLICATIONS

International Search Report for Application No. PCT/NO2009/000102 dated Jun. 23, 2009.

\* cited by examiner

*Primary Examiner* — Kerri McNally
(74) *Attorney, Agent, or Firm* — Patterson & Sheridan, LLP

(57) ABSTRACT

The invention relates to a method for measuring and controlling a fluid flow in a pipe system for liquid transport, such as oil flow during buoy loading, wherein there in each end of a the pipe system is spliced in a sensor (1) consisting of a pipe section (2) with a reinforced rubber bellows (3) positioned as a restriction within the transport pipe. The rubber bellows (3) is forced radially outward when there is oil flowing through the transport pipe, and compresses a gas filled volume in a pressure vessel (4) via a pipe connection (4B) in communication with an annulus (5), and a pressure transmitter (6A/B) gives signals to a control system (7). The sensor (1) on the platform and the tanker vessel measures relative changes in the liquid flow between the two measuring points, as the measurements from the tanker vessel is received via a telemetry system, and the signals from the two measuring points are compared continuously by the control system on the platform, which triggers an alarm and shuts down the loading process automatically at deviation in the measurement on the tanker vessel compared to the reference measurement on the platform.

2 Claims, 2 Drawing Sheets

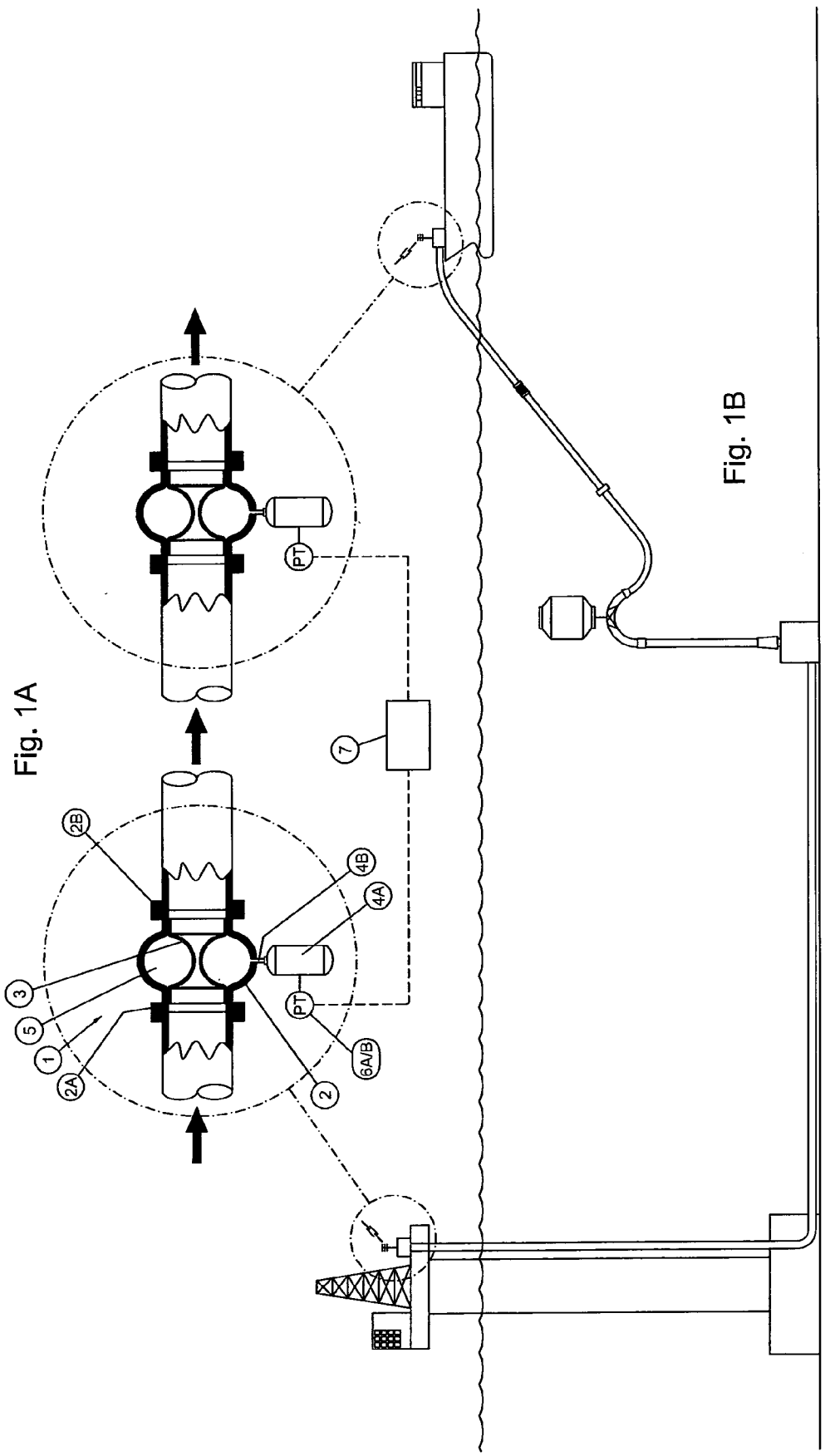

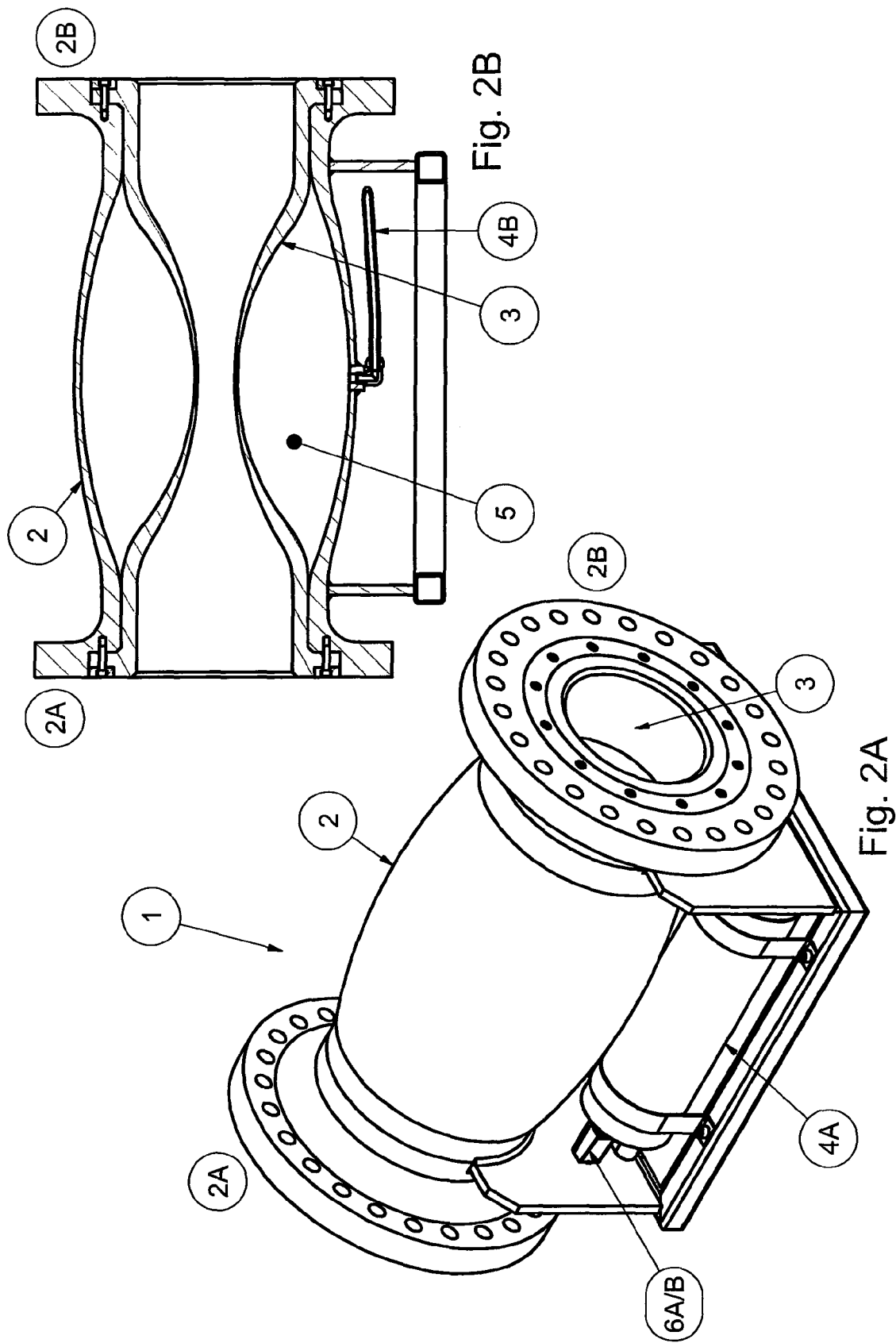

LIQUID FLOW MEASURING DURING BUOY-LOADING

FIELD OF THE INVENTION

The invention relates to a method of measuring and controlling a flow in a piping system for liquid transport, such as the oil flow during buoy loading, as given in the introduction to the accompanying claims.

BACKGROUND OF THE INVENTION

There is a need for a technically safe and continuous monitoring of the oil flow by detecting a hose failure or a limited leak during buoy loading.

On Wednesday the 12$^{th}$ of December 2007, large quantities of crude oil were spilt during buoy loading of the tanker vessel Navion Britannica at Statfjord A in the North Sea. The spill was a consequence of a failure in the upper part of the loading buoy system (OLS) in the hose running from the buoy to the vessel. The loading system can transfer up to 7500 m$^3$ of oil per hour. Statoil has stated that pumping of the oil to sea went on for 45 minutes, and that the spill amounted to about 4000 m$^3$. The system was shut down when one caught sight of the oil flowing up at the vessel.

An OLS system consists of a base frame connected to the platform via a pipeline. A vertical riser runs from the base frame and up to a swivel being held up by a floating element. A flexible pipe runs from the swivel to another swivel having another flexible riser, which is pulled into the bow of the tanker. Coflexip supplies the flexible risers. A valve, which may be released hydroaccoustically, is installed at the bottom of the vertical riser to shut down oil loading if a leak should arise.

A filling operation may take up to twenty hours for the largest shuttle tankers, and extra vigilance is needed to ensure that there are no leaks to sea. Visual inspection is part of the routines, but this is problematic when it is dark. The loading operations are manually monitored by comparison between measurements on the platform and on the ship. The OLS system is also monitored by means of pressure sensors to detect leaks.

The loading operations offshore are manual. The measurements on the ship and on the platform are separate systems, and comparison does not take place continuously.

The comparison is thereby not reliable since the measurements may vary, even if they should be equal over time.

The OLS system is monitored by means of pressure sensors to detect leaks, but the oil has a very low pressure as it enters the tanker, and a pressure drop in the oil flow due to leaks is therefore difficult to detect.

The volumes being filled and emptied on the platform and the ship respectively is monitored. There is a telemetric communication between tanker and platform to transmit these data so that differences may be discovered. This did however not function satisfactorily in the incident at the Statfjord field.

There exist leakage detection systems for subsea installations. The system consists of passive and active sonar. Leaks give off sound that may be detected by passive sonar. The active sonar detects bubbles as a consequence of gas leaks. The system functions at distances of 500 m or more. No such monitoring system has been supplied for subsea loading buoys, but such systems are used on pipelines, and they may also be used in loading operations. StatoilHydro has installed such leakage detection systems at Troll Pilot, Tordis and Ormen Lange. The complexity and cost are higher than for the invention applied for.

From the patent literature as background technology is put forward:

US 2007131297 A1 describes a method for monitoring a hydro carbon liquid stream flowing through a pipe combined with a two-layer hose for liquid transport offshore, where an optical sensor detects any leak collecting in an empty space at the hose end terminal if leaks from the inner layer flow into the interstice between the inner and outer hose layer. Reports may be given automatically via telemetry to a monitoring station. The invention works on a different principle than that described in this application, as this also functions through comparison of two measurements to indicate leaks between the measuring points.

NO 180132 B describes an external combined protection and leak indication device for a circular flange connection, and differs considerably from the invention applied for both regarding object and embodiment. The device measures leakage directly at a leakage point, while the invention applied for compares two measurements to detect leakage between the measuring points.

NO 317072 B1 describes monitoring of a pipeline system and is intended for another use without a description of the physical design of the measuring device.

SUMMARY OF THE INVENTION

The present application relates to a method to measure and control a fluid flow in a pipe system for liquid transport, such as the oil flow during buoy loading, and the method is characterised by those in the claims stated characteristics.

BRIEF DESCRIPTION OF THE DRAWINGS

FIG. 1A shows a sensor mounted in a section of pipe.

FIG. 1B shows a pipe system for oil transport between a tanker and a platform.

FIG. 2A shows the external shape of the sensor.

FIG. 2B shows a section through the sensor.

DETAILED DESCRIPTION OF THE INVENTION

FIG. 1A shows a sensor 1 mounted in a short section of pipe 2, which with end flanges 2A and 2B are joined onto each end of a pipe system for oil transport running between a tanker and a platform, shown in FIG. 1B. The reinforced rubber bellows 3 of the sensor 1 is positioned as a restriction within the pipe, a gas filled volume 4A is in a pipe connection 4B with an annulus 5, and a pressure transmitter 6A/B gives out a signal to a control system 7.

The sensor 1 on the platform and the tanker respectively measures relative changes in the fluid flow between the two measuring points. The measurements from the ship are received via a telemetry system, and the signals from the two metering units are compared continuously by the platform control system. If deviations in the measurements onboard the tanker relative to the reference meter onboard the platform occurs, this will indicate a leakage, and the control system will trigger an alarm thereby automatically stopping the loading process.

The sensor 1 shall detect changes in flow and functions at low pressure. The rubber bellows 3 is compressed radially by gas in the annulus 5, when there is no oil flowing through the pipe, and resists forces in the direction of flow. The rubber bellows 3 is forced out when oil is flowing through the pipe and compresses the gas filled volume. A change in the gas pressure is measured and is used to compare liquid flow.

FIG. 2A shows the external shape of the sensor 1 in 3D. The pipe section 2 with flanges 2A/B is connected to a gas filled pressure vessel 4A, which is provided with two pressure transmitters 6 A/B, whereof one of them is included for redundancy purpose. The attachment of the internal rubber bellows 3 to the flange 2A is visible inside in the flange opening.

FIG. 2B shows a section through the sensor 1 with the external pipe section 2, rubber bellows 3 attached to the flanges 2A/B, annulus 5 and a part of the pipe connection 4B leading to the pressure vessel 4.

The invention claimed is:

1. A method for measuring and controlling a fluid flow in a pipe system for liquid transport, characterized in that in each end of a pipe system for oil transport running between a tanker vessel and a platform is spliced in a sensor consisting of a pipe section with a reinforced rubber bellows placed as a restriction within the transport pipe, and which is forced radially outward when oil flows through the transport pipe, and which compresses a gas filled volume in a pressure vessel via a pipe connection from an annulus, and that the gas filled volume within the pressure vessel communicating with a pressure transmitter, which gives signal output to a control system.

2. A method according to claim 1, characterized in that the sensor on the platform and the tanker vessel measures relative changes in the liquid flow between the two measuring points, as the measurements from the tanker vessel is received via a telemetry system, and the signals from the two measuring points are compared continuously by the control system on the platform, which triggers an alarm and shuts down the loading process automatically at deviation in the measurement on the tanker vessel compared to the reference measurement on the platform.

* * * * *